(12) United States Patent
Stevens

(10) Patent No.: US 6,404,880 B1
(45) Date of Patent: Jun. 11, 2002

(54) METHOD AND APPARATUS FOR DELIVERING CRITICAL INFORMATION

(75) Inventor: Gilman R. Stevens, Fairview, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/471,632

(22) Filed: Dec. 24, 1999

(51) Int. Cl.[7] ................................................. H04M 7/00
(52) U.S. Cl. ............................. 379/221.11; 379/201.12
(58) Field of Search ....................... 379/201.12, 204.01, 379/221.11, 88.22, 88.25

(56) References Cited

U.S. PATENT DOCUMENTS

| | | | | |
|---|---|---|---|---|
| 5,742,905 A | * | 4/1998 | Pepe et al. ................... | 455/461 |
| 6,094,478 A | * | 7/2000 | Shepherd et al. ........... | 379/211 |
| 6,233,313 B1 | * | 5/2001 | Farris et al. ............. | 379/133 X |
| 6,243,572 B1 | * | 6/2001 | Chow et al. ................ | 455/408 |

FOREIGN PATENT DOCUMENTS

WO     WO 98/23080 A2     5/1998

OTHER PUBLICATIONS

PCT International Search Report for International Application No. PCT/US00/35228 dated Aug. 28, 2001.

\* cited by examiner

*Primary Examiner*—Creighton Smith
(74) *Attorney, Agent, or Firm*—James A. Harrison

(57) ABSTRACT

A method and apparatus for providing subscriber alerts that warn the subscriber to severe weather and traffic conditions is provided wherein the subscriber may receive the alerts on a cellular phone, on a public switched telephone network phone (PSTN), on a pager, or by e-mail. Additionally, the subscriber may receive wakeup and reminder calls according to his or her subscriber profile If a defined weather condition is occurring or is about to occur in a defined zone, for example, or if a specified traffic condition is occurring on the defined traffic artery the subscriber receives alerts as specified in a subscriber profile stored within a server coupled to an intelligent network (IN) type of PSTN. A server, e.g., an SCP or IP, generates signaling to prompt an autodialer to dial a call to the subscriber and an IVR to play the select message. With respect to the wakeup and reminder services, the IVR contains a list of recordings in celebrity voices that serve to remind or wakeup the subscriber at a designated time. To generate the various types of alerts, a plurality of weather sensor systems are coupled to the IP or to the SCP to provide weather information thereto. Additionally, a plurality of traffic sensors are coupled to deliver traffic flow information to the SCP or IP. The types of weather sensing systems included Doppler Radar and Satellite based systems. the types of Traffic flow monitoring sensors include radar and infrared speed measuring devices as well as passive flow measuring devices.

16 Claims, 5 Drawing Sheets

| SUBSCRIBER PROFILES FOR SUBSCRIBER |
|---|
| Weather     210<br>212 — Category 4, 5 or 6 Thunderstorm<br>214 — 50 mile per hour winds (or greater)<br>216 — Hail<br>218 — Tornado |
| Zones     220<br>222 — Home Zone<br>224 — Work Zone 1<br>226 — Work Zone 2<br>228 — School Zone<br>229 — Grandmother Home Zone |
| Alert Methods     230<br>232 — E-mail to me@weatherwired.uncom<br>234 — Page to aaa-bbb-cccc<br>236 — Phone Call to ddd-eee-ffff<br>238 — Phone Call to ggg-hhh-iiii |
| Traffic Conditions     240<br>242 — Speed below 15 m.p.h. on Greenville (S. of I635),<br>244 — Central Expressway (S. bound North of I635),<br>246 — E. Bound I635 from Greenville<br>248 — TollRoad (S. bound South of I635) |
| Wake Up & Reminder Alerts     250<br>252 — Call home (or cellular or pager), no. jjj-kkk-llll<br>254 — at dd/mm/yy at hh/mm<br>256 — With Greeting mmm by Celebrity NNN |

FIG. 2

METHOD AND APPARATUS FOR DELIVERING CRITICAL INFORMATION

BACKGROUND

1. Technical Field

The present invention relates generally to communication networks and more particularly to subscriber features for telephone networks including intelligent networks (IN), signaling system 7 (SS7) networks and wireless networks.

2. Related Art

There's an old saying, "If you don't like the weather, wait 10-minutes." This expression has been used to reflect the idea that weather conditions often change very quickly. Often the change is welcome. Sometimes, however, the change can have a dramatic effect on one's ability to carry out planned activities or to reach an appointment on time. Moreover, it is very desirable to be aware of weather changes as they happen so that one may be properly dressed or prepared for it. For these reasons, many individuals have developed certain habits to monitor the weather carefully.

For example, some individuals build their morning schedule around the weather report on the local televisions news station. Other individuals, on the other hand, prefer to listen to radio stations that specialize in giving weather reports many times in a single hour. Yet others purchase radio sets that are built especially for receiving and playing weather information.

With the advent of the internet, some individuals make a habit out of turning on the computers and logging into the internet page of a weather information service organization. By way of example, certain well known periodicals carry a weather section that is continuously updated. Because weather conditions can change rapidly, however, severe weather conditions still manage to surprise us. When severe weather conditions form, it is often difficult to prepare for it in a timely manner. Many people, unfortunately, do not find out about the severe weather until they are caught up in it. Even if they had watched the weather reports in the morning, the morning reports can be obsolete and inaccurate by mid afternoon. Thus, there exists a need for a system to deliver severe weather reports to those people that are affected by it.

In addition to the need for knowing about severe weather as weather conditions rapidly change, many people also need to know about severe traffic conditions as they occur. In today's age of long commutes from suburbia to downtown, the likelihood of a traffic mishap or auto breakdown creating huge traffic jams that dramatically add delay to one's commute is too high. It is very desirable, therefore, to also find out whether there a "traffic jam" exists on a traffic artery that one ordinarily uses to get to work. Traffic reports are a popular part of morning radio and television shows for this reason.

One problem with traffic reports, however, is that they often are not received on a timely basis. Once an individual finally hears a traffic report on the radio, for instance, it is often too late because that individual is already committed to taking the clogged artery and is already mired in the traffic jam. Using traffic reports for obtaining traffic information is hit or miss in terms of the information being delivered in a timely manner. Moreover, traffic jams are sometimes nearly an hour old before they are first reported on some radio or television stations. In some cases, traffic accidents have been cleared before the report of the traffic jam is broadcast over the airwaves.

The individual that is concerned with how sporadic changes in the weather or traffic conditions affect his or her ability to be at an appointment on time has a need for the timely delivery of critical weather and traffic information.

In addition, for those individuals that also typically wake up to an alarm every day, there exists a need for a more pleasant or effective system for waking sleeping individuals. Not only, for example, must an alarm clock be turned on, but also, one's own alarm clock is not always available. For example, the frequent traveler must either transport an alarm clock with him or he must learn to use the hotel's alarm clock. Additionally, he must rely on that clock functioning properly. Alternatively, he can request a wake up call from the hotel. The wake up calls that are received, however, typically are not very pleasant or personal. What is needed, therefore, is a system that more effectively and more pleasantly wakes people up.

What is needed, therefore, is a system which delivers weather information, delivers traffic information, and can also serve as a better wake up system that is flexible enough to provide the information needed to the individual at whatever location the individual may presently be found.

SUMMARY OF THE INVENTION

With the advent of the internet, of wireless networks, and of improved public switched telephone networks that are based around intelligent network architectures, it is becoming possible to create new services that transcend the different types of networks to create service concepts that reach across and through the various networks. A method and apparatus provide for providing subscriber alerts that warn the subscriber to severe weather and traffic conditions is provided wherein the subscriber may receive the alerts on a cellular phone, on a public switched telephone network phone (PSTN), on a pager, or by e-mail. If a defined weather condition is occurring or is about to occur in a defined zone, for example, or if a specified traffic condition is occurring on the defined traffic artery wherein the defined traffic artery is one that the subscriber normally takes to get to a destination on a routine basis, the subscriber receives alerts as specified in a subscriber profile stored within a server coupled to an intelligent network (IN) type of PSTN.

For example, the alert is generated if the traffic on a specified traffic artery falls below a certain speed. Finally, the inventive method and apparatus provide for wake up and reminder services that are generated to anyone of a list of destinations as specified by subscriber profile. For example, either a wake up or reminder call may be generated to the subscriber's home telephone, to his or her cellular telephone, to a pager, or even to an e-mail account.

To create a system that may deliver these alerts in an effective manner, a combination of networks are coupled to provide the alerts. More specifically, a PSTN based server is coupled to communicate with a wireless network, the internet, and perhaps a pager network to deliver e-mail messages, pages, and telephone calls to the subscriber according to his or her subscriber profile. For those instances in which a page is being generated or a call is being generated either to a cellular phone or to a PSTN telephone, an auto dialer is used to establish the connection to the defined terminal.

Additionally, an integrated voice response system is used to play the specific messages or to generate the specific text messages on the cellular and landline PSTN telephones. In an alternate embodiment of the invention, the specific text messages may be generated either by an service control point or by an intelligent peripheral. Additionally, these networks are integrated and are coupled to communicate with a traffic warning system and with a weather warning system. A traffic warning system that comprises a traffic artery mapping system as well as a plurality of traffic sensors that are communicatively coupled to the traffic artery mapping system that is connected to the coupled networks.

In one embodiment of the invention of the traffic warning system, the traffic sensors include infrared and radar based speed-measuring devices. In other embodiments of the invention, the traffic sensors are passive devices that merely generate information about flow rates on given traffic arteries.

A weather warning system includes a weather mapping system that is communicatively coupled to a plurality of weather sensors and to the coupled networks. For example, Doppler Radar systems as well as satellite weather tracking radar systems are integrated into the weather mapping system to provide weather information thereto. The weather mapping system accordingly, monitors the sensor data to generate alerts when specified types of weather conditions occur. The weather mapping system also analyzes the data to determine the location of the specified weather condition and to predict a path route for the specified weather condition.

The weather condition, its location, and its predicted path route are all generated and produced to the service control point and/or the intelligent peripheral 112 of the public switched telephone network. The public switched telephone network devices, in turn, specifically analyzes the received alerts from the traffic warning system or from the weather warning system to determine whether any of the received alerts affect any subscribers of the critical information delivery subscriber features. Additionally, the PSTN, and more specifically a SCP or intelligent peripheral analyze a plurality of subscriber profiles to determine what subscribers are to be notified for the traffic or weather conditions specified in the alert(s).

In addition to received alerts that convey weather or traffic information, the invention includes generating alerts to a subscriber as a wake up or reminder service according to parameters defined by the subscriber. More specifically, a celebrity voice is used to deliver a select message at a specified time. The messages can be a standard wake up message, a reminder to check a calendar for a pending obligation, or even a quote from a famous play, skit, song or other public event. The mere event of receiving a select quote can be enough to remind the subscriber to check his or her calendar.

BRIEF DESCRIPTION OF THE DRAWINGS

A better understanding of the present invention can be obtained when the following detailed description of the preferred embodiment is considered with the following drawings, in which:

FIG. 2 is a table illustrating an exemplary subscriber profile for the inventive method and apparatus for delivering critical information;

DETAILED DESCRIPTION OF THE DRAWINGS

Figure 1:
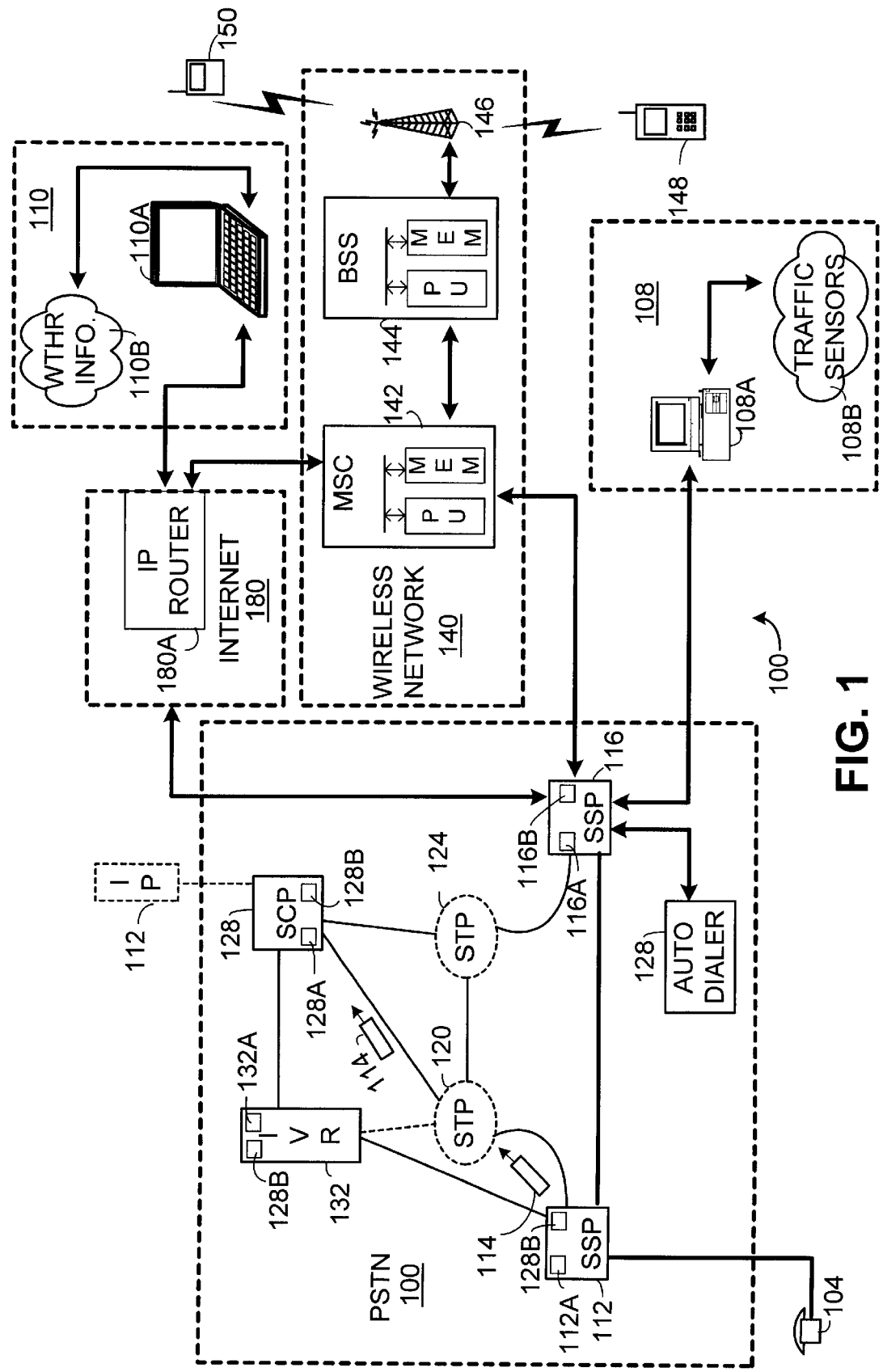
FIG. 1 is a functional block diagram of a plurality of networks coupled to form a network for delivering critical information according to a preferred embodiment of the invention.

FIG. 1 is a functional block diagram of a plurality of networks coupled to form a network for delivering critical information according to a preferred embodiment of the invention. Referring now to FIG. 1, a public switched telephone network 100 is coupled to communicate with a wireless network 140 and an internet 180. Additionally, the public switched telephone network 100 (PSTN 100) is coupled to a telephone 104, to an external intelligent peripheral (IP) 106, to a traffic warning system 108, and to a weather warning system 110 by way of the internet 180.

Weather warning system 110 includes a weather mapping system 110A that is coupled to receive weather information from a plurality of different weather sensors 110B. The weather mapping system 110A is a computer system containing computer instructions that define the logic for receiving and tracking weather patterns. Accordingly, the weather mapping system 110A is capable of displaying graphics that illustrate weather activity. In a preferred embodiment, coded graphics are used to reflect the severity of a given weather condition. The weather information provided by the weather sensors 110B includes information obtained from common weather sensors such as Doppler Weather Radar and weather tracking satellite systems as well as more mundane sensors such as electronic barometers, thermometers, and rain measuring instruments.

The weather mapping system 110A also includes computer instructions that define logic for determining whether specified weather conditions have resulted so as to prompt the computer instructions to generate messaging to an application within the PSTN 100 so that weather alerts may be generated as described herein. For example, in the described embodiment, some individuals seek to be informed whenever a thunderstorm of categories 4, 5 or 6 are detected. Thus, if a category 4, 5, or 6 thunderstorm is detected by the weather information sensors 110B within a geographic area that is defined by weather mapping system 110A, weather mapping system 110A generates messaging to PSTN 100 detailing the specific weather conditions, its location, and its expected path route.

Traffic warning system 108 includes a traffic artery mapping system 108A that is coupled to receive traffic information from a plurality of traffic sensors 108B. The traffic sensors 108B include sensors for detecting traffic speed at specified locations on specified traffic arteries. The traffic sensors 108B continuously provide traffic speeds for their specified locations to traffic artery mapping system 108A. Traffic artery mapping system 108A, in turn, analyzes the received traffic sensor data, determines what the overall traffic conditions are on the major traffic arteries, and creates a traffic roadmap that quickly and easily identifies traffic conditions throughout a given metropolitan area. In the preferred embodiment of the invention, the major traffic arteries are highlighted in different colors to indicate the basic traffic conditions.

To illustrate, in one embodiment of the invention, the traffic sensors 108B comprise infrared or radar based speed measuring devices similar to those utilized by local revenue and taxation departments for determining vehicular speed.

Other sensors merely count the number of automobiles that pass a given point in a given period of time. During rush hour traffic, when it can be safely assumed that traffic patterns are heavy, the average number of cars passing a given point provides a good indication of the traffic conditions.

Traffic artery mapping system 108A includes computer instructions that not only create the graphical displays of traffic artery conditions, but also to generate alerts when specified traffic conditions reach certain categories. For example, whenever a portion of a major artery falls below a specified speed, by way of example, 15 miles per hour, traffic artery mapping system generates a message to PSTN 100 to advise it of the same.

Public switched telephone network 100 communicates with an intelligent peripheral (IP) 112 to determine the appropriate responses each time a weather alert or a traffic alert is received. By way of example, if subscriber only subscribes to the traffic warning system subscriber feature, then IP 112 examines subscriber A's subscriber profile each time a traffic alert is received to determine if the traffic condition is one for which subscriber A wants to be notified. If subscriber A has a routine path for getting to work in the mornings, by way of example, Central Expressway in Dallas north of Interstate 635, in a southbound direction, then intelligent peripheral 112 determines whether the received traffic alert from traffic warning system 108 includes traffic conditions upon the defined portion of Central Highway. If so, IP 112 generates a message to service control point (SCP) 128 to inform it that subscriber A should be notified.

IP 112 further includes a subscriber profile for the subscriber that defines exactly what types of notifications are to be provided and the manner of providing such notification. For example, IP 112 must determine whether the subscriber is to be notified by e-mail, by telephone call, by a page to a pager, or by a call to his cellular phone as well as the corresponding electronic addresses to deliver the alert. According to the types of desired notification, SCP 128 generates the appropriate responses. In order to better explain how the intelligent PSTN 100, and more particularly, SCP 128, generates the appropriate responses, it is important to have some familiarity with the operation of PSTN 100.

PSTN 100 is coupled to communicate with a calling party phone 104. More specifically, a signal switching point (SSP) 112 of PSTN 100 is coupled to communicate with calling party telephone 104 while SSP 116 is coupled to communicate with an auto dialer 106, with a traffic warning system 108, with a wireless network 140 and with an internet 180. SSP's are telephone switches (end offices or tandems) equipped with signaling system number 7 (SS7) capable software and terminating signaling links. SS7 switches generally originate, terminate or switch calls. SSP 116 also is coupled to communicate with weather warning system 110. In one described embodiment, SSP 116 is coupled to weather warning system 110 by way of internet 180. In other specific preferred embodiments, SSP 116 is connected directly to weather warning system 110.

SSP 112 also is coupled to signal transfer point (STP) 120. STP's are the packet switches of the SS7 network. They receive and route incoming signaling messages towards the proper destination and also perform specified routing. STP 120 also is coupled to STP 124. STP 124, in turn, also is coupled to SSP 116. STP 120 also is coupled to communicate with signal control point (SCP) 128. SCP's are database systems that provide information that is necessary for advanced call-processing capabilities and for providing specific user information such as user profiles as they relate to subscriber features.

While SSP's commonly communicate with an SCP by way of STPs, the presence of the STP is largely transparent in many embodiments with respect to subscriber feature operation. Accordingly, with respect to the descriptions herein, the presence of the STP in the network will be assumed to be there even if not explicitly mentioned.

Continuing to examine FIG. 1, SSP 112 is connected to communicate with interactive voice response (IVR) system 132. An IVR system is a computer having voice recognition software capable of taking a voice message and converting it to text for analysis and also capable of playing messages in either a recorded human voice or in a synthesized computer generated voice. IVR systems are specifically designed to instruct and receive instructions through a telephone without requiring digit activation.

SCP 128 includes computer instructions that define the logic for delivering information to a subscriber. SCP 128 also includes the subscriber profiles for each subscriber of the inventive critical information delivery subscriber feature. More specifically, SCP 128 includes a processor 128A and a store 128B. Processor 128A executes computer program instructions stored in store 128B to perform and provide subscriber features that are created through the logic defined in the computer instructions of store 128B. Moreover, store 128B includes a memory for storing operational parameters including, by way of example, subscriber profiles defining the subscriber features to which an individual or organization has subscribed. The specific logic defined by the computer instructions within store 128B that are to be performed by processor 128A are more specifically discussed in relation to the methods illustrated in FIGS. 2–5 that relate to the operation of the calling party filter subscriber feature. As is understood by those skilled in the art, an internal communication line or bus is used to couple the store 128B to processor 128A to enable processor 128A to determine and execute the computer instructions stored in store 128B. While SCP's have the capability maintaining the subscriber profiles and the capability of supporting and creating specialized subscriber features, IP's are often integrated into IN networks to provide a supporting role for some of the features that the SCP can support. Thus, any particular functional partitioning that is described in here with respect to the SCP and the IP may be changed to move the functionality from on device to the other.

SSP 112, as may be seen, includes a processor 112A and a store 112B. Processor 112A executes computer program instructions stored in store 112B to setup calls. In addition, according to the type of network and its protocols, the SSP 112 also performs some varying degrees of decision making and control as a part of an implemented subscriber feature. By way of example, in one embodiment, it is SSP 112 that determines that a call an IVR message is to be played to the calling party for the purpose of informing of the critical type of subscriber information. The functional processes are defined in the computer instructions stored with in s tore 112B.

The specific logic defined by the computer instructions within store 112B that are to be performed by processor 112A are more specifically discussed in relation to the methods illustrated below that relate to the operation of the network to provide the calling party filter subscriber feature. As is understood by those skilled in the art, an internal communication line or bus is used to couple the store 112B to processor 112A to enable processor 112A to determine and execute the computer instructions stored in store 112B.

IVR 132 includes a processor 132A and a store 132B. Processor 132A executes computer program instructions stored in store 132B to perform and provide messages to a called party and to interpret called party responses. The logic for playing the appropriate message or for interpreting a response is defined in the computer instructions of store 132B.

The specific logic defined by the computer instructions within store 132B that are to be performed by processor 132A are more specifically discussed in relation to the methods illustrated that relate to the described invention. As is understood by those skilled in the art, an internal communication line or bus is used to couple the store 132B to processor 132A to enable processor 132A to determine and execute the computer instructions stored in store 132B.

It is understood that there are a significant number of different types of telephone networks in which the distribution of logic varies from network to network. Thus, functions that are reserved for an SCP in one network may be reserved for the SSP or the STP in another network. Additionally, some functions, such as storing billing records may even be performed in an external intelligent peripheral such as intelligent peripheral 136 of FIG. 1.

While the particular operation of the system of FIG. 1 will be described in greater detail in relation to the description for the following figures herein, it is helpful to understand the basic operation of PSTN 100 in relation to the invention. When a subscriber profile warrants an alert for one of a specified weather condition, traffic condition or other subscriber feature such as a wake up service, SCP 128 generates the signals to provide the alerts as specified in the subscriber's profile. For example, if the subscriber is to be alerted by way of his home telephone, SCP 128 generates a signal, by way of example, to prompt SSP 112 to generate a call to the subscriber. SSP 112, in turn, prompts auto dialer.106 to dial a select set of digits to establish the call routing.

Thus, if the subscriber telephone is telephone 104, SSP 112 communicates with auto dialer 106 to generate digits to cause a call to be set up between PSTN 100 and telephone 104. Once the called party answers telephone 104, SSP 112 communicates with IVR 132 to have it play a specified message. By way of example, if the weather warning system had generated a message to SCP 128, and more particularly, to IP 112, indicating that a specified weather condition was imminent for a geographic area defined within the subscriber's subscriber profile, SSP 112 would prompt IVR 132 to play a recorded message indicating the same. Thus, when the subscriber picks up telephone 104, he or she will hear the message from IVR 132 defining the weather condition and its location or expected location.

If the subscriber profile also provided for a call to be generated to the subscriber's cellular phone, for example, cellular phone 148, then SCP 128 would communicate with SSP 116 which in turn would communicate with auto dialer 106 to dial the subscriber's cellular telephone number. The dial digits would prompt SSP 116 to route a call to wireless network 140, and more particularly, to mobile switching center (MSC) 142. MSC 142, in turn, sets up a call through base station subsystem 144 which, in turn, sends paging signals to cellular phone 148 through tower 146. Once cellular phone 148 responds, wireless network 140 operates to connect a call to SSP 116 which, in turn, plays a message, as before, from IVR 132.

If the subscriber profile provided for the subscriber to be notified via a page, similar signaling would occur to deliver a page to pager 150 either by way of the same wireless network 140 or by way of a dedicated pager network (not shown herein). The operation of the pager network, is similar to that of wireless network 140 except that a call is not set up and an IVR message is not played. Rather, IVR 132 generates a text message that is transmitted through the networks and delivered to pager 150.

If the subscriber profile includes provisions for a message being delivered by e-mail, either SCP 128 or IVR 132 generate a text message that is transmitted from SSP 116 to the internet 180, and more specifically, to IP router 180A. Internet router 180A is operable to deliver the e-mail message to the subscriber's e-mail account as provided by an internet service provider wherein the message is delivered instantly only if the subscriber is currently connected to the internet th rough his internet service provider. In the preferred embodiment, a universal resource locator (URL) is included in the any e-mail alert regarding weather or traffic conditions so that the subscriber may immediately log into the internet page containing a graphical display of the weather or traffic conditions. Stated simply, a URL is an internet address. Accordingly, the e-mail form of the alert includes an internet address of an internet location having a map that illustrates the traffic or weather conditions in a graphical format.

Finally, if the subscriber profile includes the described wakeup and reminder services, SCP 128 generates a signal to SSP 112 to prompt it to generate a call to the subscriber. SSP 112, in turn, prompts auto dialer 106 to dial a select set of digits to establish the call routing. Thus, if the subscriber telephone is telephone 104, SSP 112 communicates with auto dialer 106 to generate digits to cause a call to be set up between PSTN 100 and telephone 104. Once the called party answers telephone 104, SSP 112 communicates with IVR 132 to have it play the selected recording using a celebrity voice. Thus, when the subscriber picks up telephone 104, he or she will hear the select message from IVR 132 in the celebrity voice.

FIG. 2 is a table illustrating an exemplary subscriber profile for the inventive method and apparatus for delivering critical information. Referring now to FIG. 2, the subscriber profile shown generally at 200, five subscriber profile portions each that define either the conditions that prompt the system to generate an alert or the specific instructions for generating the alert and the manner in which it is to be generated. By way of example, subscriber profile portion 210 lists the weather conditions that generate an alert.

For example, line 212 defines the categories of thunderstorms that cause an alert to be generated. For example, if a category 4, 5 or 6 storm is detected, an alert is generated. Line 212 indicates what wind conditions cause an alert to be generated. For example, if wind gusts in excess of 15 miles per hour are detected, an alert is generated. Alternatively, if the subscriber spends time on a boat, he or she might want to be notified on the cellular phone anytime that wind gust warnings are issued by a weather monitoring station. Thus, line 212 would be used to indicate that the subscriber is to be notified upon the issuance of a wind alert. Line 216 specifies that an alert is to be generated if hail is detected. Line 218 specifies that an alert is to be generated if a tornado is detected.

In addition, however, to the specified weather conditions from subscriber portion 210, the weather alert is only generated if the specified weather conditions are occurring or predicted to occur within one of a plurality of zones. The defined zones can vary from subscriber to subscriber. For exemplary purposes, a subscriber has defined five different zones.

Line 222 defines a subscriber's home zone, while line 224 defines his work zone. Line 226, in the example table of FIG. 2, defines the subscriber's spouse's work zone. Additionally, line 228 defines the subscriber's children's school zone while line 229 defines the grandmother's home zone. Thus, if a weather condition defined in portion 210 is occurring or is predicted to occur in the zones defined in portion 220, an alert is generated to the subscriber.

The manner in which the alert is generated to the subscriber is specified in subscriber profile portion 230. For the particular subscriber, line 232 in profile portion 230 specifies that that an e-mail message is to be generated to the subscriber at a specified e-mail address. Additionally, line 234 indicates that a page is to be transmitted to the subscriber at a specified page number. Additionally, in lines 236A, 236B and 236C, a subscriber is to be called at his cellular phone (wherein the number is provided), at his work phone and at his home phone, respectively.

In the preferred embodiment of the invention, the system is implemented wherein the system generates the phone calls to each of the listed numbers in the order listed only until the subscriber or an individual answers the phone. Thus, if a call is automatically generated to the subscriber's cellular number, and the subscriber answers the call, then a call is not generated to the work and home numbers.

Subscriber profile 200 also, for our exemplary subscriber, includes a set of traffic conditions that generate an alert. For example, if traffic speed falls below 15 miles per hour on one of three specified traffic arteries, an alert is automatically generated. For example, herein subscriber profile 200, if the traffic speed falls below 15 miles per hour either on Central Highway, on Interstate 635 between the Toll Road and Forest Avenue or on Greenville Avenue, north of Interstate 635, a traffic alert is automatically generated. In the described embodiment, the traffic alert is generated according to the instructions in subscriber profile 230. In an alternate embodiment of the invention, however, a different set of defined responses are created for the alerts that are generated by the conditions listed in subscriber profile portion 240.

Finally, the exemplary subscriber and his subscriber profile 200 include a subscriber profile portion 250 that defines instructions for generating a wake up call to the subscriber. For example, line 252 specifies that the subscriber is to be called at his home number. The number at which the subscriber may be called is selectable. The list of options include the home phone, the cellular phone, and a pager. In an alternate embodiment of the invention, a subscriber also is allowed to program a temporary number, by way of example, a direct number to a location where the subscriber will be staying temporarily. Line 254 defines the date and time at which the wake up call is to be generated. Finally, line 256 specifies the specific greeting with which the subscriber is to be called. In the preferred embodiment, a plurality of different types of wake up and reminder messages are recorded in a large number of different celebrity voices. For example, in line 256, the subscriber has selected a wake up greeting by actor Clint West. In an alternate embodiment of the invention, the list of celebrity recordings not only includes wake up and reminder messages, but also celebrity quotes from well-known movies or events. For example, a well-known quote from Clint West may be used to merely wake up the subscriber or to remind him that he has an event that requires his attention. Thus, subscriber may use such a general message to remind him to check his calendar for the next scheduled obligation.

Figure 3:
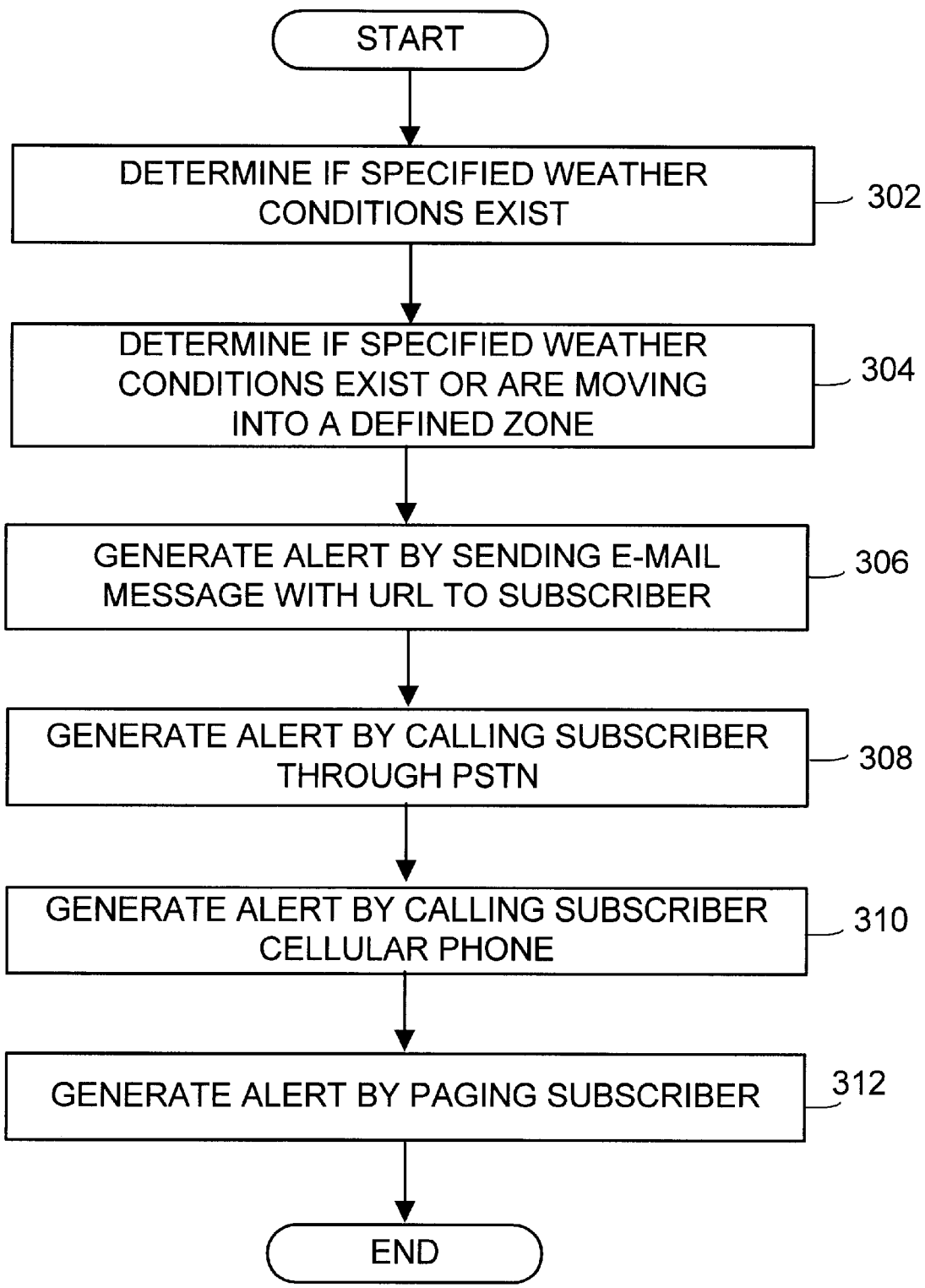
FIG. 3 is a flow chart that illustrates a method for generating an alert to advise a subscriber of a defined weather condition according to a preferred embodiment of the invention.

FIG. 3 is a flow chart that illustrates a method for generating an alert to advise a subscriber of a defined weather condition according to a preferred embodiment of the invention. Referring now to FIG. 3, the first step is to determine that a specified weather condition is occurring or is about to occur in a geographic zone listed in the subscriber profile. With reference again to FIG. 1, the method involves a determination, initially by weather map system 110A that the received weather information from a weather sensor 110B meets specified conditions.

For example, in one embodiment of the invention, any thunder storm being rated as a category 4, 5 or 6 storm prompts the weather mapping system to generate an alert to the SCP 128 of PSTN 100. The alert from weather mapping system 110A includes a definition of the affected zones. Thus, SCP 128 receives the alert from the weather mapping system 110A and determines whether any of the 'specified conditions are also conditions that are specified in the subscriber profiles (step 302).

The SCP 128 also, therefore, determines whether the specified weather conditions are occurring or expected to occur within a zone that is defined for the subscriber (step 304). If the SCP 128 (and/or IP 112) determines that a specified weather condition is occurring or will occur in a defined zone for a subscriber, it generates at least one alert to the subscriber according to the subscriber profile. For example, the method includes generating an e-mail message to the subscriber (step 306). In the preferred embodiment of the invention, the e-mail message includes a URL that the subscriber may use to connect his computer to the weather mapping system computer 110A so that a map of the weather conditions and the expected weather condition path routes may be viewed or uploaded therefrom. Additionally, if the subscriber profile requires it, a call is placed to the subscriber's PSTN phone number (step 308).

As indicated before, the SCP 128 communicates with an SSP, by way of example, SSP 116, which in turn prompts an auto dialer 106 to automatically dial the subscriber's home telephone number. Once the subscriber answers the phone, an IVR, by way of example, IVR 132 generates a voice message to inform the subscriber of the specific weather conditions and which zones those weather conditions are expected to affect.

Similarly, if the subscriber profile so requires it, a call also is generated to the subscriber's cellular phone (step 310). As before, the SSP is used, in conjunction with the auto dialer 106, to generate the call to a cellular phone number. As a result, a wireless network, by way of example, wireless network 140, connects the call to the subscriber's cellular phone.

Finally, if the subscriber profile so requires it, a text message with specific details of the impending weather conditions and the zones that they are affecting or are expected to affect, is generated to a subscriber's pager. As before, the SSP works with the auto dialer 106 to create a call to a paging network and to deliver the text message thereto. In yet another embodiment of the invention, a short message service message is delivered to the wireless network 140, which in turn is transmitted to the subscriber's cellular phone as a text message.

Figure 4:
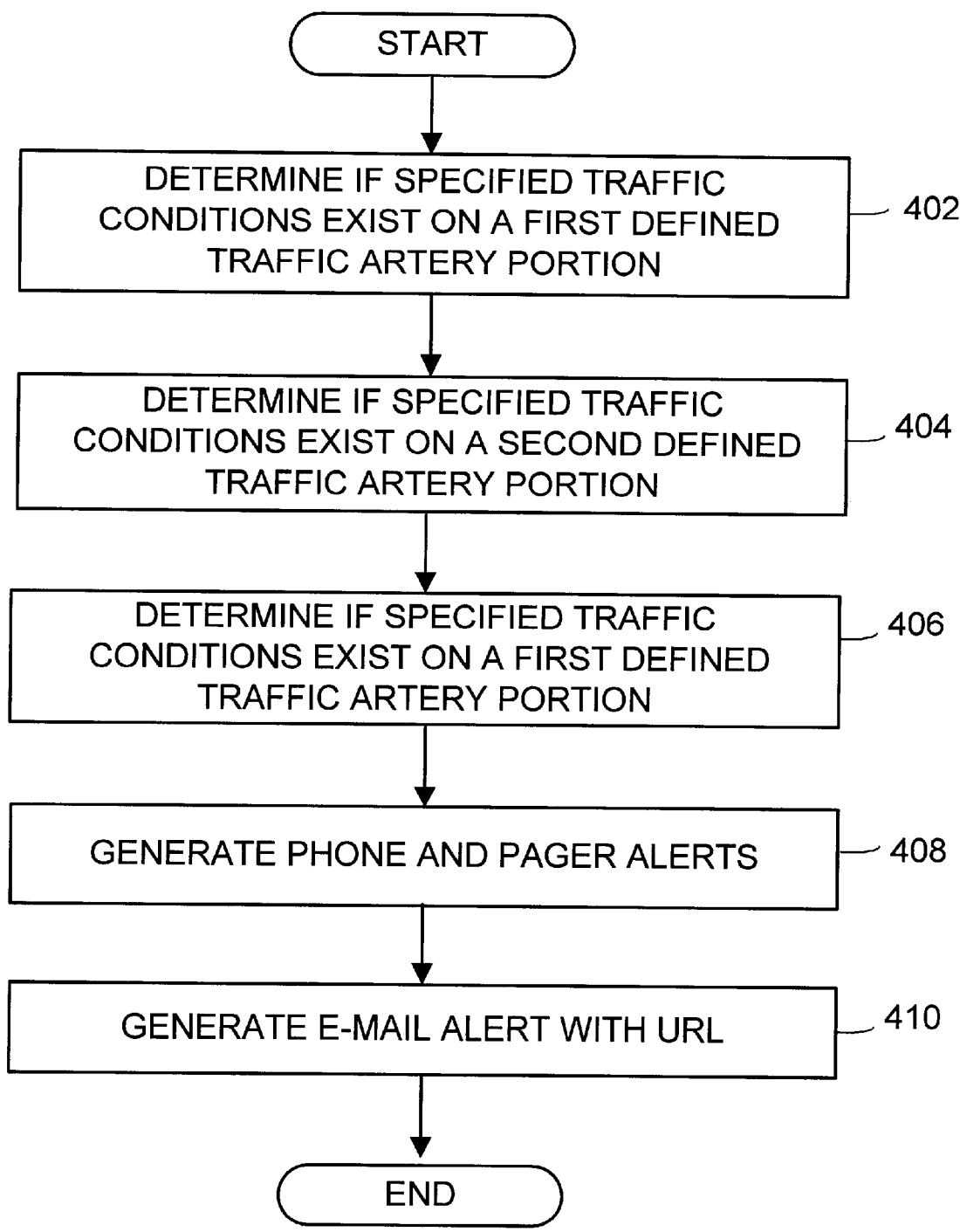
FIG. 4 is a flow chart that illustrates a method for generating an alert to a subscriber to inform the subscriber of the occurrence of a specified traffic condition on a defined traffic artery according to a preferred embodiment of the invention.

FIG. 4 is a flow chart that illustrates a method for generating an alert to a subscriber to inform the subscriber of the occurrence of a specified traffic condition on a defined traffic artery according to a preferred embodiment of the invention. Referring now to FIG. 4, the invention includes determining if a specified traffic condition exists in a first defined traffic artery (step 402). In the preferred embodiment, not only is an artery identified, but also a portion of the artery. Thus, the specific portion(s) of a traffic artery experiencing a problem are identified.

Specifically, a traffic warning system that includes a traffic artery mapping system and a plurality of traffic sensors continuously maps traffic conditions, and more specifically, traffic speeds upon a specified list of traffic arteries. Whenever traffic on a specified artery falls below a minimum traffic threshold, the traffic warning system 108 generates a message to the PSTN 100, and more specifically, to SCP 128 by way of SSP 116 to advise it of the problematic traffic conditions. More specifically, a named artery, and more specifically, a portion of a named artery is listed with the corresponding traffic flow rate. For example, for one traffic artery portion, an alert is generated if the average traffic speed falls below a defined amount. For example, if the average speed of traffic falls below 30 MPH in a portion that has a 40-MPH speed limit, an alert is generated. On another artery, however, an alert is generated whenever the average speed or traffic flow rate falls a specified percentage for that artery portion at that time of day for that type of day (workday or holiday).

For example, if the average southbound traffic speed on Central Expressway at 8:00 in the morning on a weekday is 15 MPH, an alert would be generated if the average speed fell thirty three percent or more (10-MPH). On the other hand, if the average speed is 60 MPH at 10:00 am for the same portion, then an alert would be generated if the average speed drops to 40 MPH. In yet another embodiment, the percentage drop is specified for different times of day.

SCP 128, upon receiving the traffic alert from the traffic warning system 108, determines whether the received traffic alert is one that should trigger an alert to the subscriber based upon the subscriber profile. Thus, the invention specifically includes examining whether the received traffic conditions from the traffic warning system lists any traffic conditions for any of the artery portions defined in the subscriber profile. Thus, for example, SCP 128 determines whether a specified traffic condition is occurring in a first defined traffic artery portion (step 402), or in a second defined traffic artery portion (step 404), or in a third defined traffic artery portion (step 406). In one embodiment of the invention, the subscriber selects the thresholds for the traffic alerts. In an alternate embodiment of the invention, the traffic thresholds are automatically selected for the traffic portions according to location and time of day. For this embodiment, statistical data is used by the traffic warning system to determine when traffic patterns are abnormally congested.

If the SCP 128 determines that a specified traffic condition has occurred for a specified or defined traffic artery portion, it generates alerts to the subscriber as defined in the subscriber profile. For exemplary purposes, the described embodiment includes generating phone and pager alerts to the subscriber (step 408) in addition to generating an e-mail alert containing a URL to the subscriber.

Figure 5:
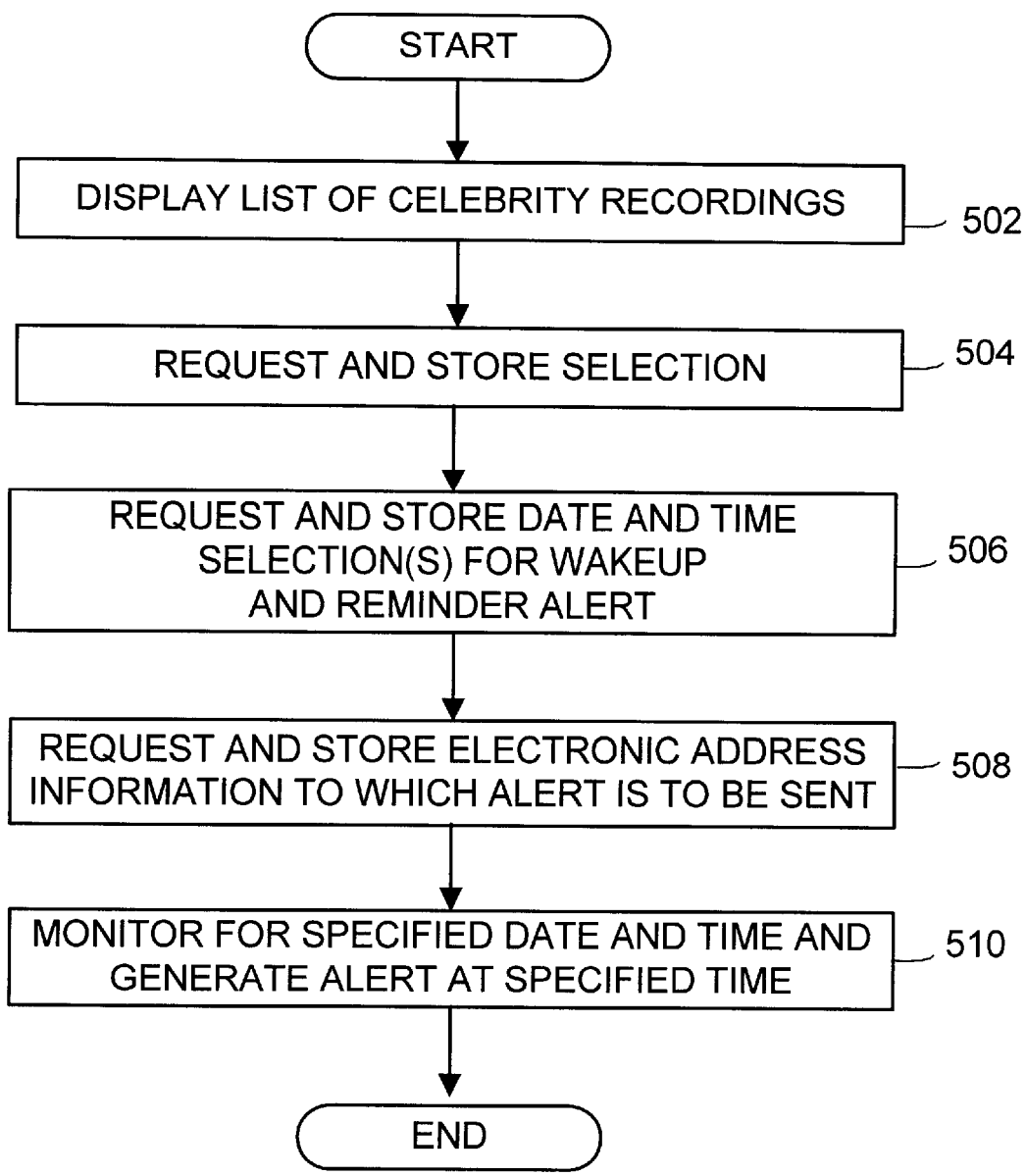
FIG. 5 is a flow chart illustrating a method for generating a wake up alert to a subscriber according to a preferred embodiment of the invention.

FIG. 5 is a flow chart illustrating a method for generating a wake up alert to a subscriber according to a preferred embodiment of the invention. First, in order to properly send an alert to a subscriber, the subscriber choices in terms of what celebrities and what recordings are played must be selected. Therefore, the method initially displaying a list of celebrity recordings (step 502). Once the subscriber has made a selection, the inventive method includes storing the selection as a part of a wake up and reminder subscriber feature subscriber profile (step 504). Additionally, the method includes prompting the subscriber to enter a specified alert date and time and then to store the same (step 506). Additionally, the inventive method includes prompting the subscriber to enter a specified alert device and the necessary information for generating the alert to that device (step 508). By way of example, if the alert device is a pager, then a pager number must be provided. Alternatively, if the alert device is a telephone or a cellular telephone, then the corresponding numbers for those devices must be supplied. Thereafter, once the profile has been set up, the inventive method includes monitoring the date and time in relation to the subscriber profile to determine if the specified date and time have arrived (step 508). Once the specified date and time have arrived, the inventive method includes generating the alert as specified within the profile (step 510).

The particular invention is advantageous in that a subscriber may receive weather warning messages so as to be prepared for an impending weather event, traffic warning messages so that he or she may choose an alternate route as well as wake up and reminder alerts so that he or she may more easily keep appointments and obligations. The particular wake up and reminder service feature not only allows one to use a pager or cellular phone as a portable alarm device, but also, in the case of a telephone, allows one to be reminded or woken up in a manner that is more pleasant and enjoyable.

The inventive method and apparatus disclosed herein are particularly advantageous in that they provide a capability for While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention. For example, any combination of the described methods may be combined to create an inventive system that reduces the amount of unwanted calls.

What is claimed is:

1. A system for providing critical information to a subscriber, comprising:

a service control point (SCP) for maintaining subscriber profiles wherein the subscriber profiles define at least one of the weather warning, traffic warning and wakeup and reminder alert services; and a sensor coupled to the SCP by way of a communication network for providing sensor information from which the SCP generates alerts according to parameters stored within the subscriber profiles.

2. The system of claim 1 wherein the sensor comprises a weather sensing system.

3. The system of claim 2 wherein the sensor comprises a satellite based weather sensing system.

4. The system of claim 2 wherein the sensor comprises a Doppler Radar weather sensing system.

5. The system of claim 1 wherein the sensor comprises a traffic flow sensing system.

6. The system of claim 5 wherein the traffic flow sensing system comprises a radar based speed measuring device.

7. The system of claim 5 wherein the traffic flow sensing system comprises an infrared based speed measuring device.

8. The system of claim 5 wherein the traffic flow sensing system comprises a passive flow rate calculating device that determines the number of vehicles that pass a defined point in a specified period of time.

9. A telecommunication network, comprising:

a service control point (SCP) including:

a processor for executing computer instructions; and a store for storing computer instructions, the store being coupled to the processor, wherein the computer instructions include logic for defining a subscriber profile, the subscriber profile defining specified events, and wherein the computer instructions include logic to generate an alert to the subscriber when the specified events occur; and an autodialer coupled to the SCP for dialing a subscriber number to generate connections to at least one of a pager transmission center, a wireless network cellular phone or a landline phone;

circuitry for generating and transmitting text messages to the pager transmission center and for inserting text in an e-mail generator; and circuitry for communicating over the internet to send e-mail messages to an IP router.

10. The telecommunication network of claim 9 further comprising an integrated voice response (IVR) system for playing messages to the subscriber, the IVR being coupled to the SCP.

11. The telecommunication network of claim 10 further comprising an SSP for routing and coupling the IVR to a subscriber phone.

12. The telecommunication network of claim 10 further comprising an SSP for routing and coupling the IVR to a wireless network for calling a subscriber cellular phone.

13. The telecommunication network of claim 10 further comprising an SSP for routing and delivering a text message to a pager by way of a pager network.

14. The telecommunication network of claim 10 further comprising an SSP for routing and delivering a text message to an e-mail account by way of an internet.

15. A telecommunication system for delivering wakeup and reminder alerts, comprising:

a server comprising logic to generate an alert according to a subscriber profile wherein the server includes circuitry for generating messaging in pager, cellular phone, landline phone and e-mail formats;

an integrated voice response system coupled to the server including recorded messages for playing select reminders in the voice of a select celebrity; and a text generator for generating text for message generator to one of a paging system or e-mail message over an internet.

16. A communication system for providing alerts, comprising:

an SCP having a subscriber profile;

an autodialer for dialing one of a subscriber phone number or pager number according to the subscriber profile;

a weather sensing system;

a traffic sensing system;

circuitry for generating text messages for insert in alerts transmitted to a pager in a paging message or to an e-mail account in an e-mail message;

circuitry for determining when to generate a wakeup/reminder call to one of a pager, a landline phone or a cellular phone; and an integrated voice response system for playing one of a weather warning, a traffic warning or a wakeup or reminder message.

* * * * *